US006009314A

United States Patent [19]

Björk et al.

[11] Patent Number: 6,009,314

[45] Date of Patent: Dec. 28, 1999

[54] MONOLITHIC HIGH FREQUENCY ANTENNA SWITCH

[75] Inventors: Christian Björk, Åkarp; Martin Lantz, Malmö; Sven Mattisson, Bjärred, all of Sweden

[73] Assignee: Telefonaktiebolaget L/M Ericsson, Stockholm, Sweden

[21] Appl. No.: 08/972,210

[22] Filed: Nov. 17, 1997

[51] Int. Cl.[6] ........ H04B 1/44

[52] U.S. Cl. ........ 455/83; 455/78; 333/103

[58] Field of Search ........ 455/78, 83; 343/876; 333/101, 102, 103, 25, 262

[56] References Cited

U.S. PATENT DOCUMENTS

| | | | |
|---|---|---|---|
| 5,054,114 | 10/1991 | Erickson | 455/78 |
| 5,060,293 | 10/1991 | Kok et al. | 455/78 |
| 5,193,218 | 3/1993 | Shimo | 455/83 |
| 5,220,679 | 6/1993 | Zametzer et al. . | |
| 5,442,812 | 8/1995 | Ishizaki et al. . | |
| 5,477,204 | 12/1995 | Li . | |
| 5,477,532 | 12/1995 | Hoshigami et al. . | |
| 5,499,000 | 3/1996 | Morikawa . | |
| 5,507,011 | 4/1996 | Chigodo et al. | 455/83 |
| 5,513,382 | 4/1996 | Agahi-Kesheh et al. | 455/83 |
| 5,521,561 | 5/1996 | Yrjola et al. | 333/103 |
| 5,689,818 | 11/1997 | Caglio et al. | 455/83 |
| 5,697,069 | 12/1997 | Bohm et al. | 455/83 |
| 5,742,212 | 4/1998 | Kato et al. | 455/83 |
| 5,789,995 | 8/1998 | Minasi | 333/103 |
| 5,911,116 | 6/1999 | Nosswitz | 455/83 |

FOREIGN PATENT DOCUMENTS

| | | |
|---|---|---|
| 0 361 801 | 9/1989 | European Pat. Off. . |
| 56-140701 | 4/1981 | Japan . |

OTHER PUBLICATIONS

European Patent Office, Standard Search Report, Mar. 26, 1998, File No. RS 100579US.

*Primary Examiner*—Dwayne D. Bost
*Assistant Examiner*—Quochien Ba Vuong
*Attorney, Agent, or Firm*—Jenkens & Gilchrist, P.C.

[57] ABSTRACT

An antenna switch for selectively connecting an output differential signal pair of an output power amplifier to a single-ended signal of an antenna when transmitting and selectively connecting an input differential signal pair of a low noise input amplifier to the single-ended signal of the antenna when receiving. A first balun having a single ended-signal connected to an antenna connects a first and second output differential signal to a power output amplifier. A second balun having a single-ended signal connected to the antenna connects a first and second input differential signal to a low noise input amplifier. A first diode selectively shorts the first output differential signal to the second output differential signal of the first balun when receiving and a second diode selectively shorts the first input differential signal to the second input differential signal of the second balun when transmitting.

11 Claims, 1 Drawing Sheet

MONOLITHIC HIGH FREQUENCY ANTENNA SWITCH

BACKGROUND OF THE INVENTION

1. Technical Field of the Invention

The present invention pertains in general to switching mechanisms for selectively connecting either a power output amplifier or a low noise input amplifier of a transceiver to an antenna and, more particularly, to an antenna switch capable of operation at high frequencies which selectively connects differential signals of either a power output amplifier or differential signals of a low noise input amplifier of a radio transceiver to an antenna.

2. Description of Related Art

When connecting a single antenna to a radio transceiver, a mechanism is required to selectively connect a transceiver output to the antenna while isolating a transceiver input from the antenna during transmissions and selectively connect the transceiver input to the antenna while isolating the transceiver output from the antenna during receptions. In the past, input and output signals from the transceiver have typically been designed in a single-ended fifty ohm environment with various methods available for providing the switching functionality. For example, a Field Effect Transistor (FET) is incorporated onto a single pole double throw circuit configuration to selectively connect the single-ended signals to the antenna depending on whether the transceiver is transmitting or receiving.

Although Field Effect Transistors in a single pole mechanisms are capable of incorporation onto a single integrated circuit chip along with the transceiver, their operation is limited to relatively low frequencies. Operation at higher frequencies typically requires the use of a discrete PIN diodes or expensive Gallium Arsenide transistors to perform the switching function. For example a commonly known technique uses a PIN diode in combination with a quarter wavelength transmission line to selectively transform a short circuit to an open circuit and vice versa for selectively connecting and disconnecting the antenna to either the power output amplifier or the low noise input amplifier of the transceiver.

Today, there are increased demands to reduce the size of radio equipment particularly in the radio telephone industry. To reduce the size of the radio equipment, more and more functionality is being incorporated onto a single integrated circuit chip. As more functionality is integrated onto a single integrated circuit, however, interference between different functional blocks increases. To reduce the interference, signals running between components are routed as differential signals rather than single-ended signals. Therefore, to incorporate an antenna switch "on-chip" a mechanism for connecting a differential output signal pair of the power output amplifier and a differential input signal pair of the low noise amplifier to a single-ended signal of the antenna is required. Moreover, the antenna switch needs to operate at relatively high radio frequencies used by many radio telephones found today and to appear in the future. These radio frequencies can be in excess of two gigahertz.

It would be advantageous, therefore, to devise an antenna switch for selectively connecting a differential output signal pair of a power output amplifier and a differential input signal pair of a low noise input amplifier of a transceiver to a single-ended signal of an antenna. It would further be advantageous if the antenna switch operated at frequencies above two gigahertz and was capable of integration onto a single integrated circuit chip, particularly a Bipolar Complementary Metal Oxide Semiconductor, with the transceiver. It would still further be advantageous if the antenna switch was inexpensive to fabricate.

SUMMARY OF THE INVENTION

The present invention comprises an antenna switch for selectively connecting an output differential signal pair of an output power amplifier to a single-ended signal of an antenna when transmitting and selectively connecting an input differential signal pair of a low noise input amplifier to the single-ended signal of the antenna when receiving. A single-ended signal of a first balun is electrically connected to an antenna and a first and second differential signal of the first balun are electrically connected to a power output amplifier. A single-ended signal of a second balun is electrically connected to the antenna and a first and second differential signal of the second balun are electrically connected to a low noise input amplifier. A first diode selectively shorts the first differential signal to the second differential signal of the first balun when the transceiver is receiving resulting in an open circuit in the first balun. Thus, the single-ended signal is isolated from the first and second differential signals of the first balun. Likewise, a second diode selectively shorts the first differential signal to the second differential signal of the second balun when the transceiver is transmitting resulting in an open circuit in the second balun. Thus, the single-ended signal is isolated from the first and second differential signals of the second balun. A preferred diode for use in the present invention is a Bipolar Complementary Metal Oxide Semiconductor diode used for electrostatic protection on integrated circuit chips.

BRIEF DESCRIPTION OF THE DRAWINGS

For a more complete understanding of the present invention, reference is made to the following detailed description taken in conjunction with the accompanying drawing wherein.

DETAILED DESCRIPTION OF EMBODIMENTS

Figure 1:
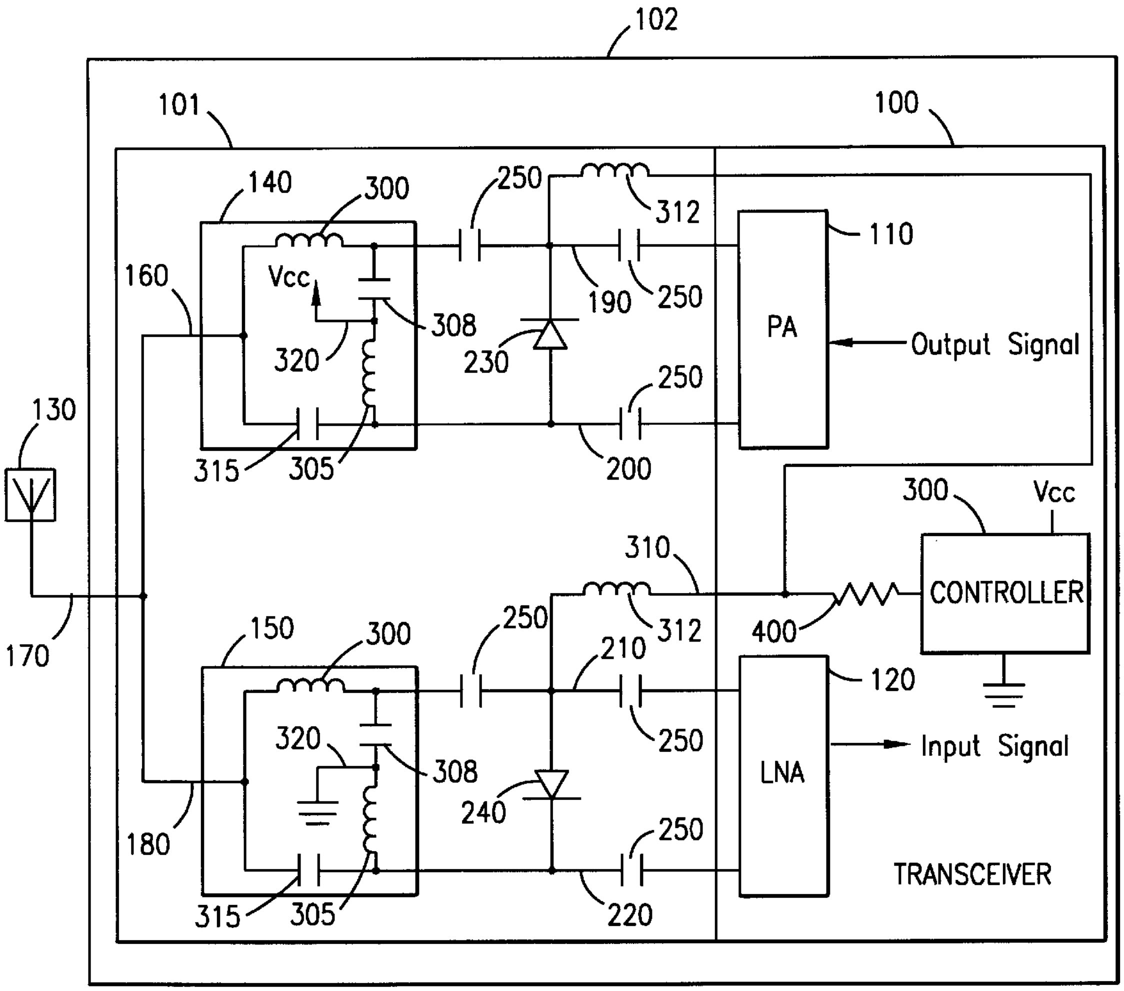
FIG. 1 is a functional block diagram of an antenna switch circuit of the present invention.

Referring now to FIG. 1, there is illustrated a functional block diagram of a circuit for implementing an antenna switch. A transceiver 100 comprises a power output amplifier 110 for transmitting an output signal and a low noise input amplifier 120 for receiving an input signal. The power output amplifier 110 and low noise input amplifier 120 are electrically connected to an antenna 130 via an antenna switch 101. In a preferred embodiment, the transceiver 100 and antenna switch 101 are fabricated as a single integrated semiconductor component 102. The antenna switch 101 includes a first balun 140 and a second balun 150 which respectively connect the power output amplifier 110 and the low noise input amplifier 120 to the antenna 130. A single-ended signal port 160 of the first balun 140 is electrically connected to a single-ended signal port 170 of the antenna 130. Likewise, a single-ended signal port 180 of the second balun 150 is electrically connected to the single-ended signal port 170 of the antenna 130.

The output of the power output amplifier 110 is electrically connected to the first balun 140 via an output differential signal pair comprising a first output differential signal 190 and a second output differential signal 200. Likewise, the input of the low noise input amplifier 120 is electrically connected to the second balun 150 via an input differential signal pair comprising a first input differential signal 210 and a second input differential signal 220.

A first diode 230 is electrically connected between the first output differential signal 190 and the second output differential signal 200. Although any orientation of the first diode 230 can be accommodated by applying the appropriate voltages to the cathode and anode of the diode, in the preferred embodiment of the present invention, the cathode of the first diode 230 is electrically connected to the first output differential signal 190 and the anode of the first diode 230 is electrically connected to the second output differential signal 200.

A second diode 240 is electrically connected between the first input differential signal 210 and the second input differential signal 220. Similar to the first diode 230, any orientation of the second diode 240 can be accommodated, however; in the preferred embodiment of the present invention, the anode of the second diode 240 is electrically connected to the first input differential signal 210 and the cathode of the second diode 240 is electrically connected to the second input differential signal 220.

Construction and use of the baluns 140 and 150 used in the present invention are well known in the industry. As an example, the first balun 140 and the second balun 150 comprise a resonance loop created by a first inductor 300, a first capacitor 308, a second inductor 305 and a second capacitor 315. A center tap 320 is electrically connected to an appropriate voltage such as power supply voltage Vcc or ground to produce an appropriate reference voltage to be used in biasing the first diode 230 and the second diode 240. In the preferred embodiment, the center tap 320 of the first balun 140 is connected to Vcc while the center tap 320 of the second balun 150 is connected to ground.

Values of the components and the circuit configurations used in the baluns 140 and 150 are chosen based upon a desired operating frequency of the transmitted and received signals. Furthermore, direct current blocking capacitors 250, whose values are also chosen based upon the desired operating frequency of the transmitted and received signals, are included to block direct current signals. Although the present invention is applicable to all operating frequencies, the advantages of the present invention are particularly relevant at high frequencies where no inexpensive "on-chip" solution exists.

The first balun 140 is designed to resonate at the desired operating frequency of the transmitted and received signal. Under these conditions, a short circuit between the first output differential signal 190 and the second output differential signal 200 of the first balun 140 results in an open circuit condition at the single-ended signal port 160. The open circuit condition isolates the first output differential signal 190 and the second output differential signal 200 from the single-ended signal port 160 thus isolating the power output amplifier 110 from the antenna 130. As will be described, the present invention exploits this property of baluns to effectuate the antenna switch.

Likewise, the second balun 150 is designed to resonate at the desired operating frequency of the transmitted and received signal and a short circuit between the first input differential signal 210 and the second input differential signal 220 of the second balun 150 results in an open circuit condition at the single-ended signal port 180. The open circuit condition isolates the first input differential signal 210 and the second input differential signal 220 from the single-ended signal port 180 thus isolating the low noise input amplifier 120 from the antenna 130.

To isolate the low noise input amplifier 120 from the antenna 130 during transmissions, a controller 300 applies a forward biasing voltage, such as a power supply voltage Vcc, to the anode of the second diode 240 via a control signal line 310. The power supply voltage Vcc is forward biasing since the cathode of the second diode 240 is connected to ground via the center tap 320 of the second balun 150. The control line 310 also includes a current limiting resistor 400. Although separate control signal lines 310 could be used to apply separate biasing voltages to the first diode 230 and the second diode 240, a single signal control line 310 and a single biasing voltage is used in the preferred embodiment of the present invention. Therefore, the control signal line 310 is also electrically connected to the cathode of the first diode 230. Thus, when the controller 300 applies a forwarding biasing voltage Vcc to the anode of the second diode 240, it is concurrently applying a reverse biasing voltage to the cathode of the first diode 230 since the anode of the first diode 230 is connected to power supply voltage Vcc via the center tap 320 of the first balun 140.

The forward bias voltage across the second diode 240 results in a short circuit between the first input differential signal 210 and the second input differential signal 220 which in turn results in an open circuit condition at the single-ended signal port 180 of the second balun 150 thus isolating the first input differential signal 210 and the second input differential signal 220 from the single-ended signal port 170 of the antenna 130. At the same time, the controller 300 is applying a reverse biasing voltage across the first diode 230. The reverse bias voltage across the first diode 230 creates the equivalent of an open circuit across the first diode 230 and the first balun 140 operates in a normal fashion with the output differential signal pair being electrically connected to the antenna 130 via the first balun 140.

In a similar fashion, to isolate the power output amplifier 110 from the antenna 130 during receptions, the controller 300 applies voltage to the cathode of the first diode 230 which places the first diode 230 in a forward biased state. For example, by connecting the control signal line 310 to ground the controller 300 applies a forward biasing voltage to the first diode 230 since the anode of the first diode 230 is connected to power supply voltage Vcc via the center tap 320 of the first balun 140. The forward bias voltage across the first diode 230 results in a short circuit between the first output differential signal 190 and the second output differential signal 200 which in turn results in an open circuit condition at the single-ended signal port 160 of the first balun 140 thus isolating the first output differential signal 190 and the second output differential signal 200 from the single-ended signal port 170 of the antenna 130.

At the same time, the controller 300 is applying a reverse biasing voltage across the second diode 240 via the control signal line 310. The reverse bias voltage across the second diode 240 creates the equivalent of an open circuit across the second diode 240 and thus the second balun 150 operates in a normal fashion with the input differential signal pair being electrically connected to the antenna 130 via the second balun 150.

The preferred embodiment of the present invention also includes inductive low pass filters 312. The inductive low pass filters serve to isolate the first output differential signal 190 from the firs input differential signal 210. It is also understood that while the power supply voltage Vcc and ground were used to forward bias and reverse bias the first diode 230 and the second diode 240, any voltages which forward and reverse bias the diodes can be used.

To operate at relatively high frequencies, for example above two gigahertz, the first diode 230 and the second diode 230 require specific operating characteristics. An ideal diode for use as the first and second diodes 230 and 240 posses the following characteristics: a low series resistance $r_5$ during operation in a forward biased state, a long transit time $1/\tau$ and a low reverse biased junction capacitance $C_{jo}$. Although expensive semiconductor devices such as Gallium Arsenide (GaS) could be used to construct an integrated circuit chip incorporating the antenna switch and the transceiver, such a device would be prohibitively expensive.

In the preferred embodiment of the present invention, an inexpensive diode meeting these requirements is fabricated using a Bipolar Complementary Metal Oxide Semiconductor (BiCMOS) manufacturing process. Although not used as a circuit switches, diodes currently used for Electo-Static Discharge (ESD) protection in bipolar complementary metal oxide semiconductors posses the desired characteristics. For example, in the Philips Qubic 1 silicon chip manufacturing process, an electro-static discharge protection diode catalogued as DB100W posses a series resistance $r_5$ equal to three ohms in the forward biased state, a $\tau$ equal to five nanoseconds and a reverse bias junction capacitance $C_{jo}$ equal to one hundred twenty six femtofarads. These values are sufficient for operation in the preferred embodiment of the present invention at frequencies above three hundred megahertz. In the reversed bias state, this diode has a junction capacitance equal to one hundred twenty six femtofarads. Further information regarding the design and operation of these electrostatic discharge protection diodes can be found in the Philips Qubic 1 design manual or other similar bipolar complementary metal oxide semiconductor design manuals. In addition to operating at the desired frequencies, bipolar complementary metal oxide semiconductor electrostatic discharge protection diodes of this type are inexpensive to manufacture and are easily integrated into an integrated circuit chip with other functionality of the transceiver. Although the use of bipolar complementary metal oxide semiconductor diodes for electro-static discharge protection is well known, their use as a diode for providing high speed "on-chip" switching functionality has not previously been taught in the industry.

Although a preferred embodiment of the method and apparatus of the present invention has been illustrated in the accompanying Drawing and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An antenna switch for isolating an output amplifier from an antenna comprising:

a balun having a single-ended signal electrically connected to the antenna and a first and second output differential signal electrically connected to the output amplifier; and means for selectively shorting the first output differential signal to the second output differential signal of the balun when isolating the output amplifier from the antenna.

2. The antenna switch recited in claim 1, wherein the means for selectively shorting the first output differential signal to the second output differential signal of the balun comprises:

a diode electrically connected between the first and the second output differential signal of the first balun; and means for forward biasing the diode when isolating the output amplifier from the antenna.

3. An antenna switch for isolating an input amplifier from an antenna comprising:

a balun having a single-ended signal electrically connected to the antenna and a first and second input differential signal electrically connected to the input amplifier; and means for selectively shorting the first input differential signal to the second input differential signal of the balun when isolating the input amplifier from the antenna.

4. The antenna switch recited in claim 3, wherein the means for selectively shorting the first input differential signal to the second input differential signal of the balun comprises:

a diode electrically connected between the first and the second input differential signal of the balun; and means for forward biasing the diode when isolating the input amplifier from the antenna.

5. An antenna switch comprising:

a first balun having a single-ended signal electrically connected to an antenna and a first and second output differential signal electrically connected to a power output amplifier;

a second balun having a single-ended signal electrically connected to the antenna and a first and second input differential signal electrically connected to a low noise input amplifier;

means for selectively shorting the first output differential signal to the second output differential signal of the first balun when receiving; and means for selectively shorting the first input differential signal to the second input differential signal of the second balun when transmitting.

6. The antenna switch recited in claim 5, wherein the means for selectively shorting the first output differential signal to the second output differential signal of the first balun comprises:

a first diode electrically connected between the first and the second output differential signal of the first balun; and means for forward biasing the first diode when receiving and reverse biasing the first diode when transmitting;

and further wherein, the means for selectively shorting the first input differential signal to the second input differential signal of the second balun comprises:

a second diode electrically connected between the first and the second input differential signal of the second balun; and means for reverse biasing the second diode when receiving and forward biasing the second diode when transmitting.

7. The antenna switch recited in claim 6, wherein the means for biasing the first diode and the means for biasing the second diode comprises a controller which selectively applies a forward biased voltage to an anode of the first diode and a reverse biased voltage to an anode of the second diode when receiving and applies a reverse bias voltage to the anode of the first diode and a forward bias voltage to the anode of the second diode when transmitting.

8. The antenna switch recited in claim 7, wherein the means for biasing the first diode further comprises a center tap on the first balun electrically connecting a direct current power supply voltage Vcc to a cathode of the first diode, the center tap on the first balun for providing a reference voltage to the cathode of the first diode and further wherein, the means for biasing the second diode further comprises a center tap on the second balun electrically connecting a direct current ground voltage to a cathode of the second diode, the center tap on the second balun for providing a reference voltage to the cathode of the second diode.

9. The antenna switch recited in claim 6, wherein the first diode and the second diode are gallium arsenide transistors.

10. The antenna switch recited in claim 6, wherein the first diode and the second diode are bipolar complementary metal oxide semiconductor diodes.

11. The antenna switch recited in claim 10, wherein the first diode and the second diode are bipolar complementary metal oxide semiconductor electro-static discharge protection diodes.

* * * * *

UNITED STATES PATENT AND TRADEMARK OFFICE
CERTIFICATE OF CORRECTION

PATENT NO. : 6,009,314
DATED : December 28, 1999
INVENTOR(S) : Björk et al.

It is certified that error appears in the above-identified patent and that said Letters Patent is hereby corrected as shown below:

Column 1,
Line 30, between "pole" and "mechanisms" insert -- double throw circuit configuration and other switching --

Signed and Sealed this

Twenty-eighth Day of August, 2001

*Attest:*

Nicholas P. Godici

*Attesting Officer*

NICHOLAS P. GODICI
*Acting Director of the United States Patent and Trademark Office*